United States Patent [19]
Osrow et al.

[11] 4,394,410
[45] Jul. 19, 1983

[54] DISPOSABLE FOIL BROILING SHEET

[75] Inventors: Harold Osrow; Armando A. Araujo, both of New York, N.Y.

[73] Assignee: Osrow Products Company, Inc., Old Bethpage, N.Y.

[21] Appl. No.: 290,603

[22] Filed: Aug. 6, 1981

Related U.S. Application Data

[63] Continuation-in-part of Ser. No. 121,140, Feb. 13, 1980, abandoned.

[51] Int. Cl.³ .................... B32B 3/24; B32B 3/28; B32B 15/04
[52] U.S. Cl. ........................ 428/43; 99/446; 428/138; 428/152; 428/182; 428/332; 428/464; 428/906
[58] Field of Search .......... 428/43, 134, 137, 174, 428/179, 182, 152, 172, 332, 464, 906, 138; 99/446; 426/113, 124, 127, 126; 229/3.5 MF

[56] References Cited

U.S. PATENT DOCUMENTS

| | | | |
|---|---|---|---|
| 3,127,828 | 4/1964 | Fine | 99/446 |
| 3,411,433 | 11/1968 | Christopher | 426/126 |
| 3,415,662 | 12/1968 | Koger et al. | 426/113 |
| 3,453,949 | 7/1969 | Levin | 99/446 |
| 3,515,331 | 6/1970 | Guthrie, Sr. | 229/3.5 MF |
| 3,613,554 | 10/1971 | Koger et al. | 99/446 |
| 3,613,555 | 10/1971 | Ogman | 99/446 |
| 3,989,867 | 11/1976 | Sisson | 428/132 |
| 4,093,765 | 6/1978 | Schmidt | 428/134 |

Primary Examiner—Paul J. Thibodeau
Attorney, Agent, or Firm—Kirschstein, Kirschstein, Ottinger & Cobrin

[57] ABSTRACT

An improved disposable foil cooking sheet which is manufactured as a triputite laminate. The laminate comprises a generally flat foraminous impermeable foil upper layer, a central core of dry bibulous material and a generally flat imperforate lower layer. Several disposable foil cooking sheets may be connected in seriation and rolled into a roll.

7 Claims, 9 Drawing Figures

DISPOSABLE FOIL BROILING SHEET

CROSS-REFERENCE TO RELATED APPLICATION

This application is a continuation-in-part of copending application Ser. No. 121,140 filed Feb. 13, 1980 for Disposable Foil Broiling Sheet, now abandoned.

BACKGROUND OF THE INVENTION

1. Field of the Invention

A disposable fat-absorbing, generally flat, malleable thin, rectangular foil cooking sheet.

2. Description of the Prior Art

When a person cooks by heating from about (broiling) a fat-containing food such as meat, fish or poultry, two problems arise, both of which usually accompany the presence of food in an oven. One of these is the liquification of the fat in the food, and the other is a vaporization of the liquified fat which thereupon splatters indiscriminately onto the inner surfaces of the oven. The splattered fat fouls the oven which has to be cleaned by a meticulous housewife after every such use. Moreover, the splattering fat will burn anyone in front of an open door of the oven. Another problem is associated with the liquified fat that is collected in a pan beneath the food, poured into a receptacle, allowed to harden and then placed in the garbage.

It would be desirable to have a sheet suitable for placement under food in a broiling chamber so that hot liquid fat, oil, grease, juices, etc., being discharged during broiling, baking or other cooking mode is absorbed and collected and does not accumulate in the heating or broiling chamber. This accumulation in prior cooking practices lead to splattering and dirtying of the oven, small fat fires, skin burns on the person handling hot liquid fat if it was spilled or splashed, and generally unsanitary conditions in the kitchen, etc.

Typical of the prior art are U.S. Pat. Nos. 3,415,662 and 3,453,949. These patents are examples of the irrelevance of the earlier patents in this field. They disclose pans and packages.

The former, namely pans, are made of heavy-grade aluminum foil which are manufactured in the shapes of cooking receptacles, e.g., pans with high sides, and hence are bulky to ship by the manufacturer and to store by the distributor, retailer and housewife. Moreover, they are expensive to make since they entail the use of thick aluminum foil and the time and expense of processing such foil to a three dimensional configuration. Such pans incorporate the parameters of older cooking pans such as cast iron and thick metal pans in that they are rigid and heavy, and utilize sloping sidewalls, all of which are disadvantageous to and unnecessary for cooking sheets.

The latter, namely packages, are far more complex than need be for cooking sheets. Since the packages are structured for a purpose entirely different from that of cooking sheets, that is to say because they are structured to completely cover and protect food, this being unnecessary and undesirable for cooking sheets, the packages are impractical and indeed unuseable as cooking sheets.

Other patents relate to articles which are not pertinent for the reasons above-mentioned and for other causes; these patents are U.S. Pat. Nos. 3,026,209; 3,127,828; 3,411,433; 3,613,555 and 3,704,142.

SUMMARY OF THE INVENTION

1. Purpose of the Invention

The purpose of the present invention is to provide an improved, simple, disposable, essentially two-dimensional, foil cooking sheet which will occupy a minimum of space for storage of a bundle of sheets.

Another purpose is to provide an inexpensive and disposable cooking sheet which is effective and useful in the kitchen of a home or apartment and in large commercial installations for the preparation of cooked foods such as are to be found in restaurants, hotels, cafeterias, steamships, etc.

A further object is to improve the broiling, roasting or other cooking process by direct heating of food such as meat, chicken or fish by preventing the splattering, splashing, spilling, burning or non-contained accumulation of hot liquid fat or juices discharged from the food.

An additional object is to improve and simplify the art of cooking.

Still another object is to help the busy housewife in her cooking chores by reducing or eliminating the spattering of rendered hot liquid fat in broiling chambers.

Another object is to prevent spattering and dirtying of ovens during the broiling of foods and to contain hot liquid fat as it is discharged during broiling.

These and other objects and advantages of the present invention will become evident from the description which follows.

2. Brief Description of the Invention

The structure of the present disposable foil broiling element is a tripartite, generally flat, thin, malleable laminate constructed of a perforated top layer and an imperforate bottom layer of non-combustible very thin malleable food grade aluminum foil. The core segment of the laminate is an absorbent dry material with our without a structural base. A typical material is cellulose fiber such as paper or papier-mâché, patterned in any of a variety of forms with a given thickness of material to give additional structural strength, such as ribs, a waffle pattern or the like. The core also could be corrugated board with or without one or two cover layers of paper. The corrugated board, both on its surface and by virtue of is structural irregularity, allows the absorption and accumulation of most of the fat rendered while cooking.

The laminate broiling element is further improved by configuring the same in the shape of a rectangle provided with four imperforate flaps extending along each side of the rectangle. These flaps preferably are about ¾" wide; when the flaps are bent upwardly, and the ends of the flaps are joined, a shallow tray with the perforated top foil uppermost will be formed.

The perforations in the top layer are quite tiny. They are big enough to allow liquid fat to flow through them but small enough not to encourage reverse, i.e., outward, flow of fat. Thus, the liquid fat will be absorbed in the core segment and subsequently will not come out because the holes are too tiny. Hence, after the food is broiled, the housewife simply pulls the cooking sheet out of the oven, lifts the food off it, and saves the sheet for future use. After a few uses, the sheet is discarded. The housewife never bothers cleaning the sheet or the core segment; indeed, she never sees the core segment.

The two layers of foil are crimped together along all their sides to form a crimp seam. The core segment may be smaller than the registered top and bottom layers.

Optionally, the perforated top layer can be puffed or quilted.

Thus, the subject of the present invention is a malleable cooking sheet in the form of three layers which include a very thin malleable food grade aluminum foil layer. The upper layer is perforated. The intermediate layer is formed of a bibulous material, e.g., paper towelling. Alternate materials are felted cotton, felted fibres generally, or loosely woven material such as gauze. The bottom layer is imperforate. A typical size for the perforations in the top layer is 1/32". A typical spacing is 16 to the square inch. A typical thickness for each of the upper and lower layers is from ½ mil to 1 mil. The upper surface of the top layer is preferably specular so that it will reflect heat so as to keep the top layer as cool as possible. The foil layers extend beyond the middle layer to form bendable flaps. The foil layers are peripherally sealed to one another to provide a continuously sealed seam.

The cooking sheet is used by placing the same in an oven and using it as a support for meat to be broiled. The fat in the meat liquifies, running through the holes into the absorbent layer and does not spatter. All of the fat does not run through the holes because the last of the fat cannot be gathered in this manner. However, because the upper layer is relatively cool, the fat that does not flow through the holes does not heat to the vaporization point where it would spatter.

To encourage flow of fat into the openings, the top layer is preferably quilted, i.e. formed into a shape which looks like juxtaposed pillows. The quilting is inherent in the formation of the holes. The purpose of the quilting is to impart a topographical configuration to the upper surface of the top layer such that the liquified fat is directed to the openings. The openings should be at the lowest points of this topography.

To make the sheet, a bibulous web is interposed between upper and lower foil webs with the core web being narrower than the upper and lower foil webs. The outer edges of the foil webs are in registration. Then the upper and lower webs are crimped together along the longitudinal edges of the webs and also crimped transversely at intervals to continuously seal the webs to one another and form a strip of interconnected cooking sheets. The transverse crimping extends through the core web. Subsequently, the strip is cut transversely at the transverse crimps, resulting in cooking sheets of the right sizes.

Another thing that the quilting does is to increase the internal volume of the cooking sheets. This is desirable because it enables the bibulous layer to swell as it absorbs fat. The quilting is referred to as "crinkling". Crinkling facilitates the rolling of a web of connected sheets.

Another feature is that the holes at the center of the cooking sheet preferably are larger than the holes at the sides but within the size range mentioned below, to wit 1/64" to ⅛". This is because more fat normally accumulates at the center than at the sides.

It is preferred that at least the upper foil layer should have a surface composed of a multiplicity of high and low portions, so that the comestible being broiled is supported at a multiplicity of spaced zones.

The foramina or holes in the upper layer are sized in the range of about 1/16 inch to ⅛ inch across each perforation, i.e. when the foramina are circular the aforementioned numerical values refer to the diameters of the circular holes. The spacing of the foramina is in the range of about 3 to 5 to the inch in orthogonal directions. The thickness of each of the upper and lower layers is in the range of about ¼ mil to 2 mils.

In marketing the broiling sheet, typically a plurality of detachably attached sheets connected seriatim will be furnished to the consumer in a cylindrical wound roll. Thus, in a preferred embodiment the broiling sheet of the invention is one of a plurality of generally identical broiling sheets, each connected seriatim to adjacent sheets by opposed border zones, each border zone being serrated, scored, or provided with a linear plurality of juxtaposed slits, slots or perforations. In this configuration, typically the plurality of broiling sheets are rolled up into a cylindrical roll. When sheets are made the transverse seams between the sheets crimp the center layer between them. A bundle of such cooking sheets, whether rolled or flat-stacked occupies considerable less space than stacked and nested foil pans.

The present improved disposable foil cooking sheet provides numerous advantages. It eliminates the spattering of hot liquid fat in the cooking by broiling or otherwise of fat-containing foods. The present sheet also eliminates the non-contained accumulation of hot liquid fat during the broiling, both by direct absorption into the core layer of the sheet and because the lower layer of the sheet is imperforate and impermeable to liquids, so that any excess hot liquid fat accumulates in the lower part or bottom of the sheet on the lower layer, and is easily discarded together with the disposable sheet after use. Thus, the work of the housewife, cook or chef is made easier, since it is no longer necessary to frequently clean the broiling chamber and safer since there is no longer any danger of being burned by spattering hot liquid fat, oil or grease during inspection of the food during the cooking process or during handling and removal of the fully cooked food from the oven or broiling chamber after the food has been broiled or otherwise cooked.

An advantage of the present broiling sheet is that it is inexpensive and disposable, practical, and effective and useful in the kitchen of the home or apartment and in commercial installations for the preparation of cooked food using broiler ovens or broiling chambers such as those found in restaurants, cafeterias, hotels, steamships, etc. The process of broiling, roasting or other cooking by direct heating of a meat, poultry, fish, etc., is improved by preventing the spattering, splashing, spilling or burning of any and all hot liquid fat, oil, grease, juices, etc. which are discharged from food. The art of cooking food by broiling or roasting is improved and simplified by reducing or eliminating the spattering or rendered hot liquid fat, oil or grease in the broiling chamber.

The invention accordingly consists in the features of construction, combinations of elements and arrangements of parts which will be exemplified in the articles of manufacture hereinafter described, and of which the scope of application is as elucidated supra and as will be indicated in the appended claims.

BRIEF DESCRIPTION OF DRAWINGS

In the accompanying drawings in which are shown various possible embodiments of the invention.

DETAILED DESCRIPTION OF THE PREFERRED EMBODIMENTS

Figure 1:
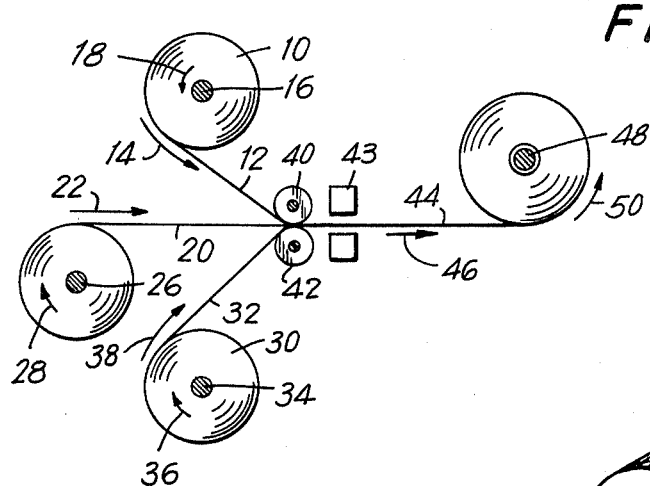
FIG. 1 is an elevation view showing the procedural sequence during assembly and formation of the present broiling sheet.

Referring now in detail to the drawings and more particularly to FIG. 1, a continuous roll 10 of food-grade malleable very thin aluminum foil is unwound into a single layer 12 which will constitute the upper foil layers of cooking sheets to be formed. The direction of the unwinding is shown by the arrow 14. The foil layer is non-combustible since it is made of metal and is provided with spaced perforations which cn be of a size from 1/64" to ⅛" across each perforation. Pursuant to the present invention, desirably the lengthwise and transverse spacing of the perforations is substantially the same. Desirably, also, all of the perforations are of the same size within the above range, although as pointed out earlier in a preferred form of the invention, the perforations in the vicinity of the center of the cooking sheet are larger than those of the perforations in the vicinity near the periphery of the cooking sheet. The thickness of the upper foil layer is of critical importance. This layer should not be thinner than ¼ mil nor thicker than 2 mils. Too thin a top foil layer leads to various difficulties such as a burning through of the top foil layer with consequent exposure of the absorbant central layer to high temperatures which might cause it to burst into flames.

Also, too thin a top foil layer will permit too substantial a transmission of high temperature heat through the upper foil with a strong probability of igniting the central layer under the high temperature conditions that prevail during broiling.

Too thick a layer also causes certain problems; for example, the cost of the cooking sheet is to a considerable extent governed by the weight of metal employed so that too thick a layer will raise the retail price of a cooking sheet so much that it will be uneconomical for a housewife to employ. Also, it is desirable to keep the fat that drains through the upper layer and is absorbed into the core layer liquid so that maximum advantage is taken of the absorption capability of the core layer; if the top layer is too thick, that is to say an excess of 2 mils, it will impede the transfer of heat through the top layer and under some circumstances permit a degree of congealing of fat soaking into the core layer so as to hinder the flow of the fat through the top foil layer.

Another factor which makes the thickness of the top layer critical is that although the top layer must be malleable so that it can be manually bent, it should not be so malleable that it will not be self-form-maintaining.

There is, therefore, a nice balance to be observed in determining the critical thickness of the top foil layer.

It also should be pointed out that similar criteria apply to the thickness selected for the bottom foil layer soon to be described. The thickness of this foil layer, i.e., bottom foil layer, likewise critically is between ¼ mil and 2 mils. The only factor that does not apply to the bottom foil layer thickness is the likelihood of burning through. However, here, too, if the oven happens to run at a high temperature during broiling, the foil might be destroyed by burning through.

It further should be noted that the sizes of the openings are critical. Openings which are too small will tend to restrict the flow of fat therethrough, particularly when they approach capillary dimensions. On the other hand, an opening, if too large, may permit fat to flow therethrough when the sheet is withdrawn from an oven after use, and inadvertently inverted. Hence, as to the sizes of the openings, they, too, represent a nice balance between too large and too small so that this dimension is critical.

To lessen the tendency of the foil to tear, particularly if it is extremely thin, means (not shown) is included to rotate the spool on which the roll is wound in the direction shown by the arrow 18.

A generally flat, continuous central core layer 20 of dry bibulous or absorbent material is unwound as shown by arrow 22 from a roll 24 rotating on a spool 26 in the direction shown by the arrow 28. Although the core layer 20 is, as just mentioned, flat, it may include corrugation extending in a direction transverse to the direction of travel 22. There is an advantage in having the core layer corrugated since it increases the bulk of the volume between the top and bottom foil layers and thereby increases the capability of the core layer to absorb hot liquid fat during cooking. By making the corrugations transverse to the direction of travel, a further advantage accrues namely the ability to wind up the trilaminate web after it has been formed. Other materials can be used for the core web, examples being blotting paper, bogus paper, papier-mâché and in the event that the core layer is supplied in the form of separate sheets which are not rolled up, and the finished trilaminate sheet is not be rolled up, said core layer can be fabricated from diatomaceous earth. As to the top layer, a continuous roll 30 of imperforate non-combustible impermeable malleable food grade aluminum foil is unwound as a single layer 32 from a rotating spool 34 in the direction shown by arrow 36.

The three layers 12, 20 and 32 after unwinding from their respective rolls, pass between upper and lower pressure sealing rollers 40,42 wherein the tripartite laminate self-form-maintaining broiling sheets of the present invention are formed and sealed by longitudinal edge crimping of the layers 12 and 32. The rolls 40,42 operate intermittently, stopping when a length of the composite strip equal to the desired length of a broiling sheet has been advanced. Each time the rolls 40, 42 stop, a transverse crimping bar 43 is actuated. The bar 43 forms a transverse crimped seal through the layers 12 and 32 and also through the core layer 20. Two successive operations of the crimping bar complete the sealing of a single cooking sheet. The crimping bar 43 also includes means to provide a transverse weakened zone mid-way between the width of the transverse crimping.

This weakened zone preferably is a transverse line of slits or perforations.

Figure 2:
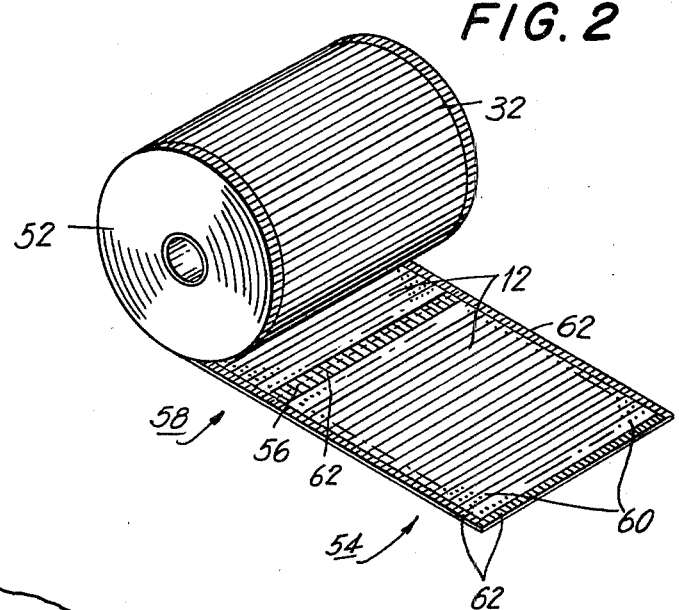
FIG. 2 is a perspective view of the finished manufactured product as marketed in a cylindrical roll consisting of a plurality of detachably attached broiling sheets arranged seriatim in a detachably attached linear plurality of sheets.

The ensuing composite tripartite laminate web 44 of easily detachable but attached broiling sheets arranged seriatim passes as shown by the arrow 46 to a windup spool 48 where the web is wound as indicated by the arrow 50 to form the finished product consisting, as shown in FIG. 2, of a cylindrical roll 52 of detachably attached broiling sheets. FIG. 2 illustrates partial unwinding of the roll 52 to supply a single broiling sheet 54 detachably attached by a score line 56 to the next adjacent broiling sheet 58. For usage, as mentioned earlier, the endmost broiling sheet 54 is manually detached from the next following sheet 58 by tearing along the line 56. As shown, perforations, that is to say foramina, are provided in the upper layer 12 having been included in the finished roll 10; however the lower layer is smooth and imperforate. The longitudinal edges of the broiling sheet are crimped during the formation of the web 44 and the transverse edges are crimped by bar 43 so that all of the peripheral edges of the broiling sheet 54 are crimped.

Figure 3:
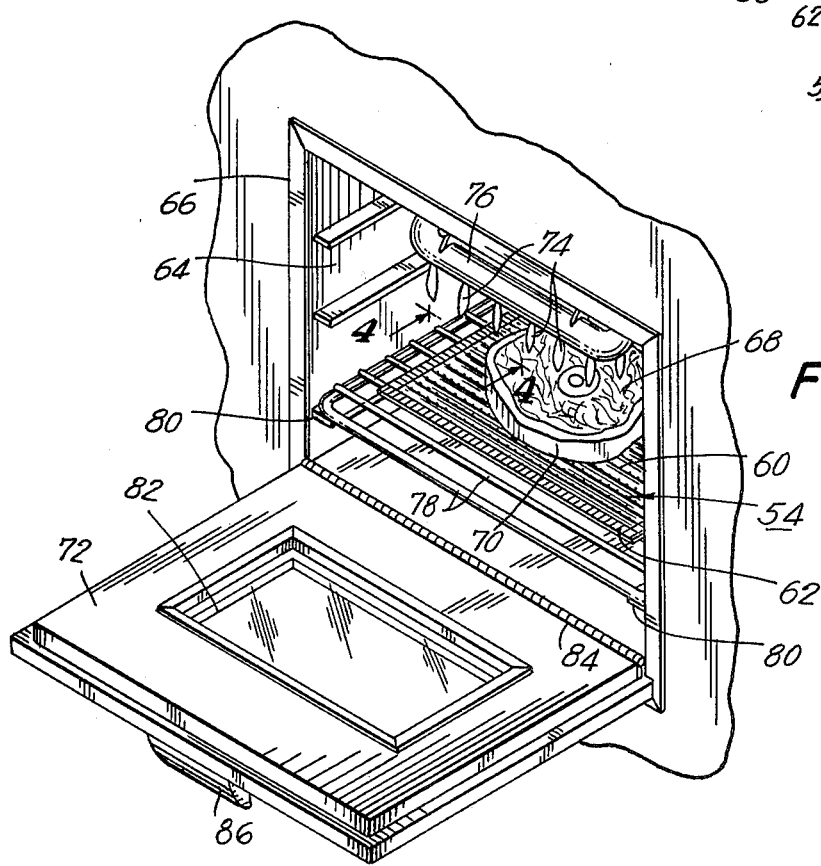
FIG. 3 shows a broiling sheet in place in the broiling compartment of an oven, together with a comestible (meat) being broiled on the broiling sheet.
Figure 4:
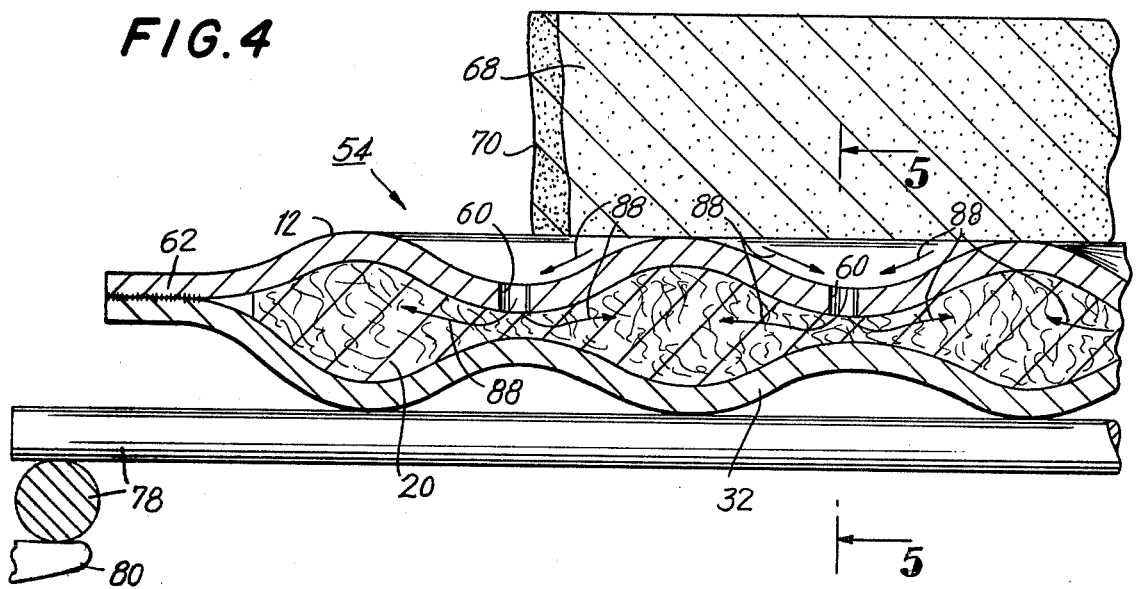
FIG. 4 is a sectional elevation view taken substantially along the line 4—4 of FIG. 3.
Figure 5:
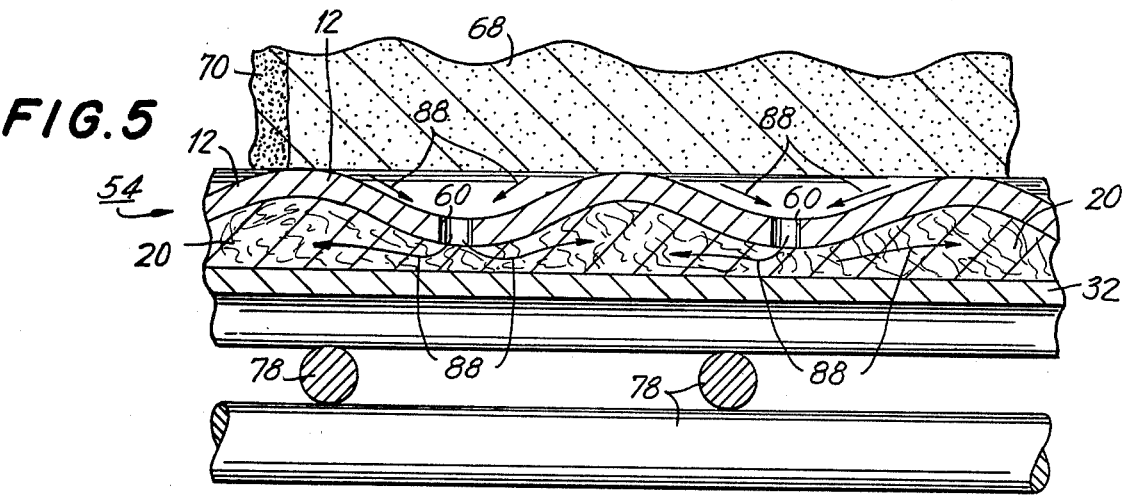
FIG. 5 is a sectional elevation view taken substantially along the line 5—5 of FIG. 4.

FIGS. 3, 4 and 5 show the broiling sheet in service in a broiling chamber 64 of an oven 66 with a comestible portion 68 consisting of a cut of meat, for example, a steak being broiled on cooking sheet 54. The steak 68 has a fatty strip 80 shown in peripheral location. This strip is rendered during the process of broiling the steak and is, in part, transformed into liquid fat as is understood by people skilled in the art of cooking, the door 72 of the oven 66 is shown in an open position as would be the case if the progress of the broiling of the steak has to be checked or inspected or the partially cooked steak is to be shifted on the broiling sheet for more uniform heating by the gas flame 74 issuing from a gas burner 76 in the oven chamber 64.

The broiling sheet rests on an oven rack 78 which supports it and the weight of the steak 68 below the flames 74 that play on the steak and broil it. The rack 78 in turn rests on opposed rails 80 provided on the innter wall of the oven chamber 64. The oven door 72 may be provided with a window 82 to enable the housewife to view the inside of the oven chamber 64 for checking the progress of cooking taking place in the oven 66. The door 72 is mounted along its lower edge on hinges 82 for swinging motion to an open or closed position by manual manipulation facilitated by a handle 86.

It is quite apparent that spattering of the hot liquid fat derived from the strip 70 of fat will cause the fat to impinge on the inner surface of the window 82 and exert a deleterious affect on the appearance and transparency of the window 82. This however is prevented by the use of the novel broiling sheet of the present invention.

The importance and criticality of the thickness of the aluminum foil layers and of the sizes of the perforations in the upper layer cannot be stressed too strongly. Unless these dimensions are maintained within the critical ranges set forth above the sheet will not function properly or will not function at all.

As detached from the roll 52 a single broiling sheet is generally flat, disregarding any local irregularities due for example to the possible corrugated structure of the central bibulous core and indeed this generally flat configuration is well adapted for the basic use of the cooking sheet inasmuch as the sheet is large enough to extend well, e.g., $\frac{1}{2}''$ to $1''$ at a minimum, beyond the periphery of a comestible placed on this sheet for cooking purposes within an oven chamber. Nevertheless, many housewifes might not feel safe when using a generally flat broiling sheet because, probably for psychological reasons, they might feel that the liquid fat might run off the edge of the sheet. In fact this will not occur because the fat will find its way through the perforations in the top layer into the bibulous core well before the fat will reach the edge of the sheet. However, it is to encourage such housewives to purchase and use the cooking sheet that the margins of the cooking sheet extend beyond the bibulous core element and are formed from malleable material, i.e. thin, food grade, aluminum foil. Due to this provision, the marginal portions of the sheet can be bent up by hand with great ease and they are sufficiently self-form-maintaining to hold this bent up configuration. At the corners of the rectangular sheet the marginal portions are pinched together so that the sheet is thus fashioned into the shape of a quite shallow pan. As just indicated, that retaining edge which would seemingly be provided to hold in the liquid fat is not necessary and the structure above described is employed for the purpose of providing the retaining edge solely to satisfy housewives who otherwise might be disinclined to purchase the cooking sheet.

Naturally if a great deal of fat is rendered the boundary flange will serve the function of holding in fat but it is ill-suited for this purpose.

Figure 6:
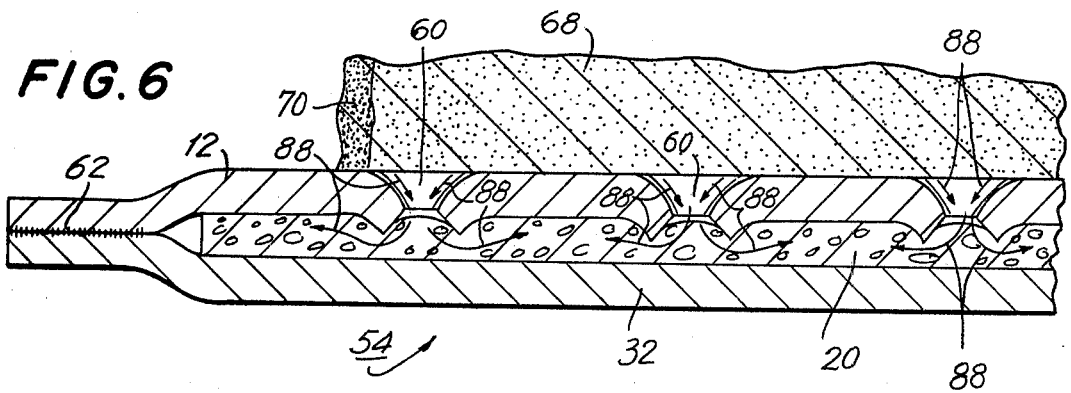
FIG. 6 is a sectional elevation view comparable to FIG. 5 but showing an alternative embodiment of the invention.

FIGS. 4, 5 and 6 show different aspects and configurations of broiling sheets within the scope of the present invention. In all these FIGS. 4, 5 and 6, the progress and passage of hot liquid fat, oil and grease derived from the fat strip 70 of the comestible 68 is as indicated by arrows 88. The hot liquid fat, etc. rendered from the fat-containing comestible 68 being broiled in the broiling chamber 64 while resting on broiling sheet 54 drains through the foramina or holes 60 in the upper foil layer 12, under the influence of gravity, to be absorbed in the dry bibulous core layer 20 and to be trapped by the lower foil layer 32, so that spattering of the rendered fat shown as arrows 88 in the broiling chamber 64 will be reduced or completely eliminated. As shown in FIGS. 4 and 5, the core layer may be absorbent cotton or other dry bibulous or absorbent material, while in FIG. 6 the layer 20 is absorbent paper. The FIG. 6 configuration is also characterized by the provision of slightly different shaping for the foramina 60, as well as a generally flat planar upper foil layer 12, as contrasted to FIGS. 4 and 5 in which the broiling sheet 54 is quilted due to formation of the foramina. Thus, in the FIGS. 4 and 5 configuration, at least the upper layer 12, and in fact both the upper and lower layers 12 and 32, respectively, has a surface composed of a multiplicity of high and low portions, so that the comestible 68 being broiled is supported at a multiplicity of spaced zones. This facilitates the ingress and collection of hot liquid fat as shown by arrows 88. FIGS. 4 and 6 also show at 62 how the peripheries of the upper and lower layers 12 and 32 are crimped together, to seal them together where they extend beyond the edges of the central core layer 20.

Figure 7:
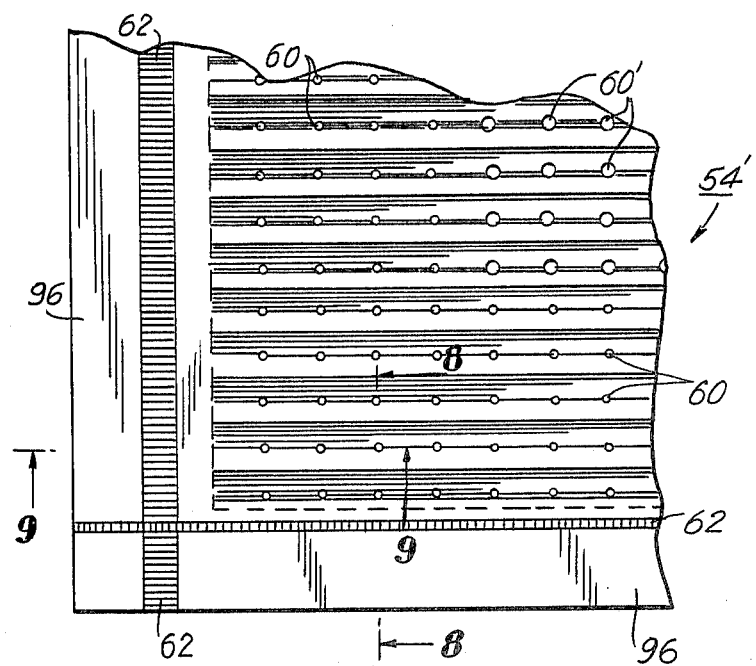
FIG. 7 is a partial plan view of another alternative embodiment of the present broiling sheet.
Figure 8:
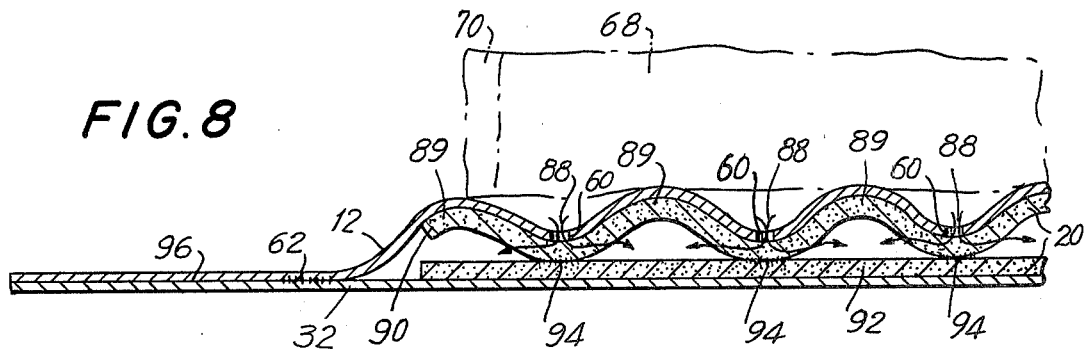
FIG. 8 is a partial sectional elevation view taken substantially along the line 8—8 of FIG. 7.
Figure 9:
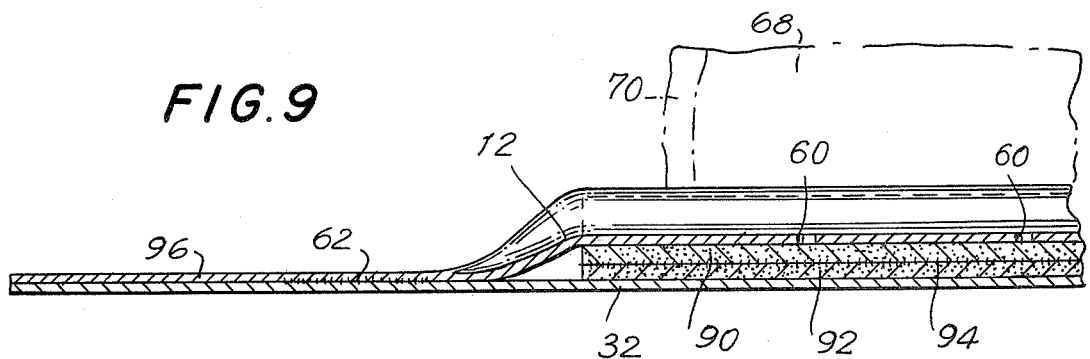
FIG. 9 is a partial sectional elevation view taken substantially along the line 9—9 of FIG. 7.

FIGS. 7, 8 and 9 show an embodiment of the invention in which the central core layer 20 is an absorbent single-faced corrugated cardboard or paperboard. The upper layer 12 assumes the sinusoidal shape of the corrugations 89 of the upper corrugated portion 90 of the central core layer 20, while the lower layer 32 is flat, since the lower portion 92 of the central core layer 20 is flat and planar, the portions 90 and 92 being joined together at staged intervals by gluing 94. Thus the configuration of the broiling sheet 54' of FIGS. 7, 8 and 9 differs somewhat from that of the prior figures but is still within the scope of the present invention. Another difference is that in FIGS. 7, 8 and 9 the peripheries of the upper and lower layers 12 and 32 extend beyond the edges of the central core layer 20, and also beyond the crimped zone 62, as indicated by 96, sufficiently to provide deformable and bendable flanges 96 on the edges of the broiling sheet 54'. It will be understood, however, that it is not necessary for the sheet to extend beyond the marginal crimped zones in order to provide sufficient material to be bent up as upstanding flanges. Finally, as shown in FIG. 7, the central foramina 60' are larger than the outer foramina 60.

It thus will be seen that there are provided disposable foil broiling sheets as articles of manufacture which achieve the various objects of the invention and which are well adapted to meet the conditions of practical use.

As various possible embodiments might be made of the above invention, and as various changes might be made in the embodiments above set forth, it is to be understood that all matter herein described or shown in the accompanying drawings is to be interpreted as illustrative and not in a limiting sense. Thus, it will be understood by those skilled in the art that although preferred and alternative embodiments have been shown and described in accordance with the Patent Statutes, the invention is not limited thereto or thereby.

We claim:

1. A tripartite, laminate, generally flat, self-form-maintaining, thin, cooking, rectangular, sheet element comprising:
    (A) a generally flat, foraminous, rectangular, upper layer composed of non-combustible, impermeable, malleable aluminum foil,
    (B) a generally flat, continuous, rectangular, central core layer composed of a dry bibulous material capable of absorbing hot liquid fat, and
    (C) a generally flat, rectangular, lower, imperforate layer composed of non-combustible, impermeable, malleable aluminum foil coextensive and in registry with the upper layer, whereby rendered fat from a fat-containing comestible being broiled in a broiling chamber while resting on said element will drain through the foramina in said upper foil layer, to be absorbed in said core layer, trapped by said lower foil layer and contained between said upper and lower foil layers, so that spattering of the rendered fat in the chamber will be reduced,
    (D) said upper and lower layers extending peripherally beyond the boundaries of the core layer and being peripherally sealed together by continuous seams to form a peripheral margin having a thickness not in excess of 4 mils,
    (E) the periphery of said tripartite element being sufficiently deformable to be manually bendable with great ease and to be pinched together at the corners of the rectangular element to form peripheral flanges on all edges of the cooking sheet, which flanges are self-form-maintaining so that the element can be formed into the shape of a shallow pan,
    (F) the thickness of each of the foil layers being between $\frac{1}{4}$ mils and 2 mils,
    (G) the sizes of the foramina ranging between 1/64" and $\frac{1}{8}$" across.

2. A sheet element as set forth in claim 1, wherein the spacing of the foramina is 3 to 5 to the inch in orthogonal directions.

3. A sheet element as set forth in claim 1, wherein the exterior surface of the upper layer is specular.

4. A sheet element as set forth in claim 1, in which the upper layer is crinkled.

5. A sheet element as set forth in claim 1, in which the foramina located in the vicinity of the center of the upper layer are larger than the foramina located in the vicinity of the periphery of the upper layer.

6. A sheet element as set forth in claim 1, in which the sheet is one of a plurality of substantially identical broiling sheets, each connected seriatim to adjacent sheets by opposed border zones, adjacent border zones being separated by a weakened zone.

7. The plurality of sheet elements of claim 6 in which the sheet elements are rolled up into a cylindrical roll.

* * * * *